UNITED STATES PATENT OFFICE.

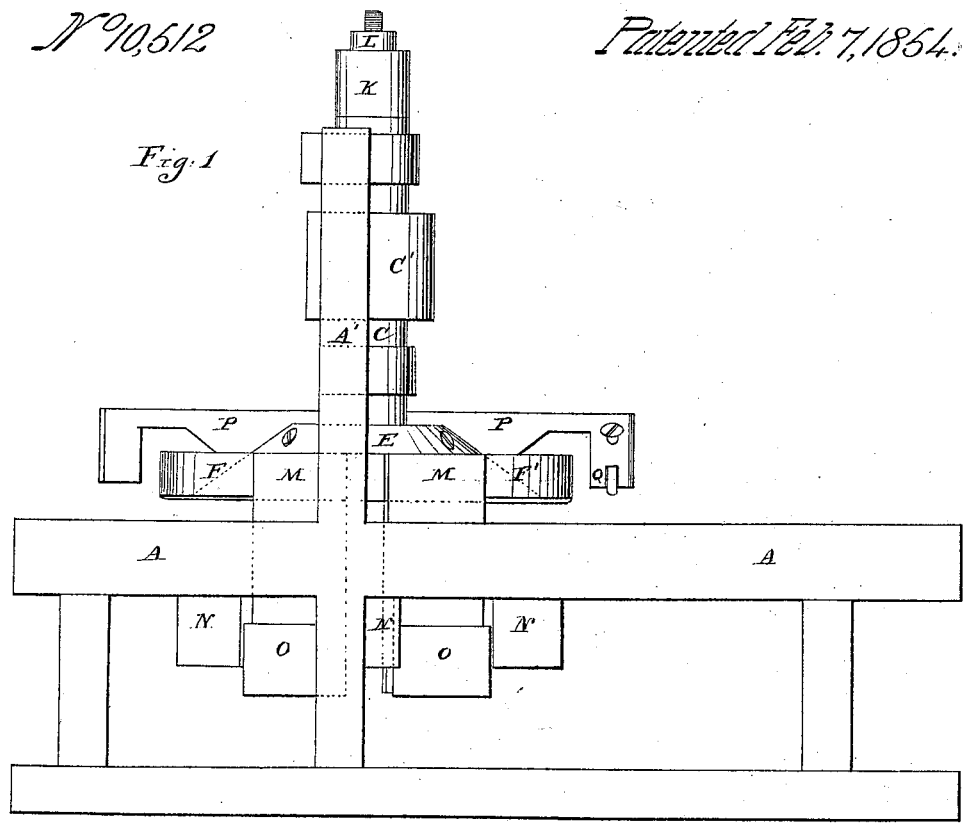
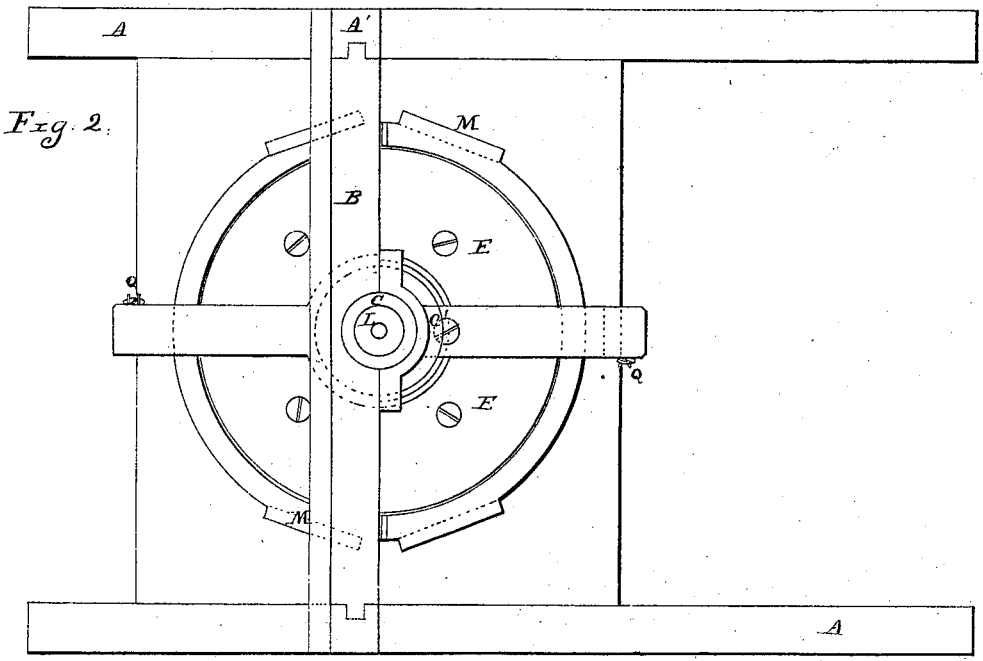

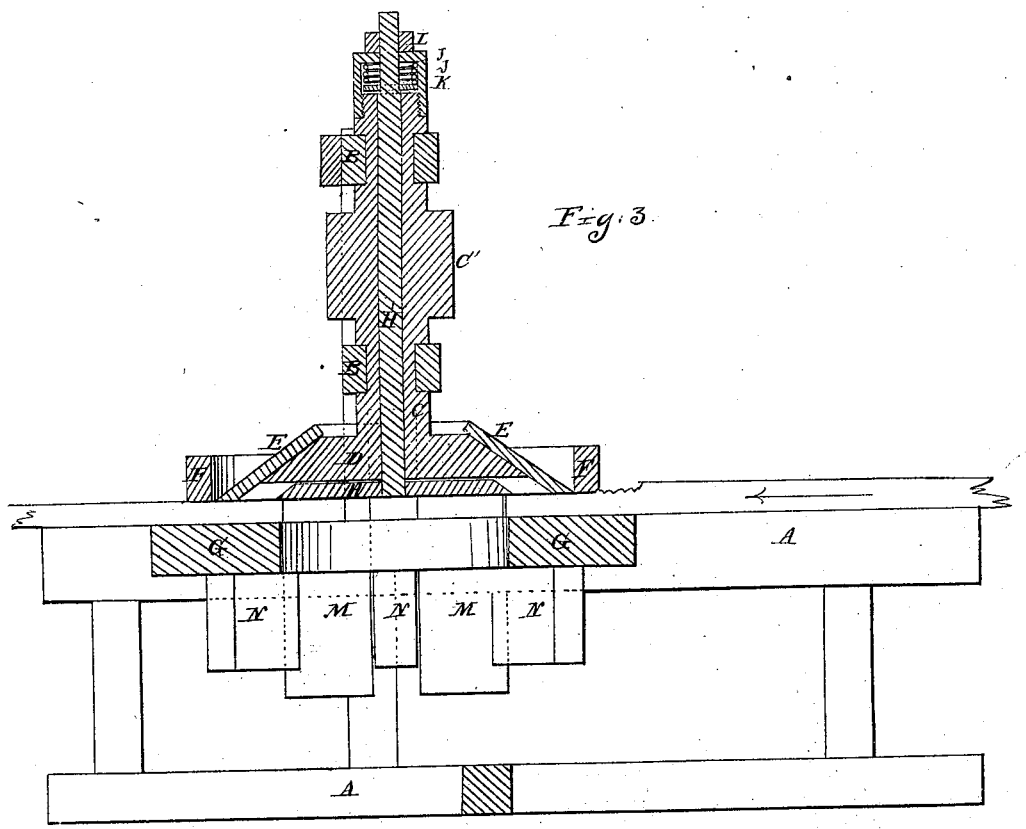

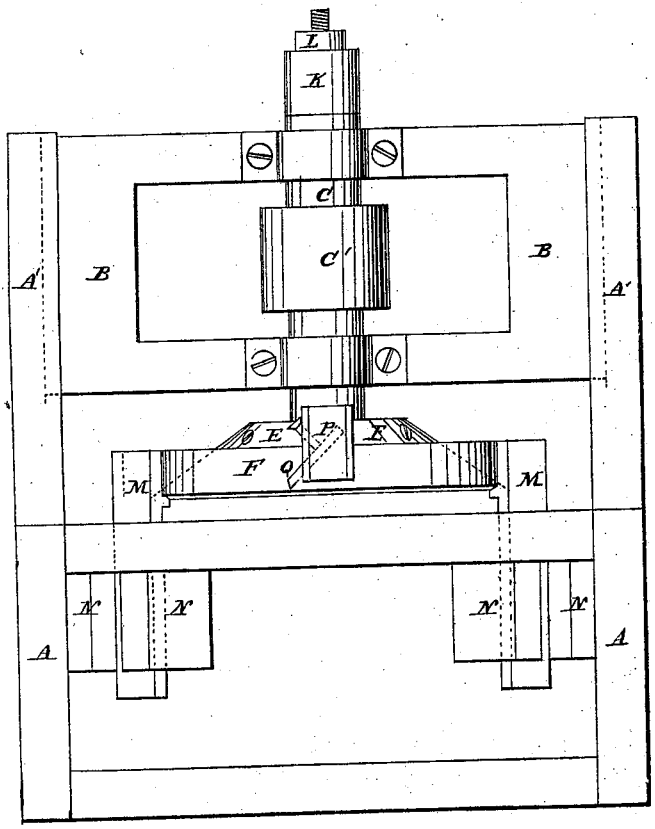

JAMES A. WOODBURY, OF WINCHESTER, MASSACHUSETTS.

PLANING-MACHINE.

Specification of Letters Patent No. 10,512, dated February 7, 1854.

*To all whom it may concern:*

Be it known that I, JAMES A. WOODBURY, of Winchester, in the county of Middlesex and State of Massachusetts, have invented certain new and useful Improvements in Machines for Planing Boards and for other Similar Purposes; and I do hereby declare that the following is a full, clear, and exact description of the nature and operation thereof, taken in connection with the accompanying drawings, making part of this specification.

The subject matter of my invention relates to a new and improved arrangement of the cutting apparatus in a machine for planing boards, planks, &c., and consists, in the first place, in the employment of a rotating disk cutter so called, which is made with a cutting edge around its periphery, concentric with the axis of rotation, and is arranged to rotate in the plane of the surface of the board to be planed; in combination with a bed upon which the board rests; and certain devices by which the board is held down upon the bed, and which also act as a mouth piece to hold the fibers of the material firm under the operation of the disk cutter.

The second part of my invention consists in combining the Bramah wheel so called with the rotating disk cutter for the purpose of removing the surplus material before it is acted upon by the disk cutter to finish its surface.

Figure 1, of the drawings is a side elevation; Fig. 2 is a plan; Fig. 3 is a vertical longitudinal section through the middle; and Fig. 4, an end elevation, of that part of a planing machine to which my improvements relate.

The letters refer to like parts in all the figures.

A, A, &c., is the frame of the machine. It is provided with two upright posts A', upon either side thereof, between which the frame B is placed, which is made to move up and down, being guided in grooves in the posts, as shown, or in any other convenient manner. The frame B is provided with proper bearings to carry the vertical shaft C. This shaft receives the driving power by the pulley C', and at its lower end it carries the cutter stock D upon which the circular cutters E are fastened. The cutter stock is made in the form of a frustum of a cone and the cutters E are made in segments of a funnel formed shape, as shown, to fit the stock. The lower edges of the cutters are ground so as to make the edges thereof in the circumference of a circle, concentric with the shaft, and in the same plane.

F, F', are presser bars which surround the disk cutter, and serve to hold the board firmly upon the bed G which extends across the frame A beneath the cutter and supports the board in the act of planing. The bar F' also acts as a mouth piece to the disk cutter, to confine the fibers of the wood at the point of cutting and prevent the tearing up or splitting of the surface and leaving it rough.

H is a presser plate within the disk cutter for the purpose of assisting to hold the material to be planed when it is flexible or limber. It is attached to a spindle H' which extends upward through the center of the shaft C and carries upon its upper end a collar I upon which the helical spring J presses, which is coiled within the hollow cap K screwed upon the upper end of the shaft C as is shown in section in Fig. 3.

L is a check nut upon the spindle H' to prevent the presser plate H from falling too low when the board is removed.

By the action of the spring J the presser plate H is pressed firmly down upon the board in a perfectly obvious manner.

The presser bars F, F', are attached to the sliding pieces M which are guided in their vertical movement between the guide blocks N, and are held down by the weights O attached thereto or by some other analagous devices.

P, P, are arms attached to the shaft C which extend outward beyond the pressers F, F', and are provided with gouge cutters Q and operate like the well known Bramah wheel so called.

The devices for carrying the board forward, and for adjusting the height of the frame B and the cutters, and also many other minor details of a planing machine, are neither shown nor described as they constitute no part of my invention, which may be used with any of the well known arrangements for such purposes, which are in common use in the construction of planing machines; and therefore I have particularly described those parts only to which my improvements specially pertain.

The operation of the improved machine is as follows: The frame B is adjusted to the proper height so that the disk cutter shall be at the required distance from the bed G to give the necessary thickness to the board. The board is fed into the machine in the usual manner and is carried forward by feeding rollers or other appropriate device, in the direction of the arrow as shown in Fig. 3. When it arrives at the Bramah wheel most of the surplus material is removed thereby and the board is reduced to an uniform thickness. It then passes under the presser F' and meets the disk cutter, which, by its rotary motion in connection with the progressive movement of the board, acts upon it with what is known as a "drawing cut" and removes from its surface a continuous shaving. The fibers of the wood are held during the action of cutting by the presser F' which presses firmly upon the surface of the board in close proximity to the cutting edge. This peculiar movement of the cutting edge is highly favorable to the cutting of the surface smoothly when the grains of the wood run obliquely, and also to offering but little resistance to the progressive movement of the board. In the planing of clapboards and other similar bodies which are nearly of uniform thickness, the use of the Bramah wheel is not required. It is also proposed to employ the first part of my invention in the splitting and shaving of leather and other similar substances in which case also the Bramah wheel would not be used.

It is obvious that the devices employed may be much modified in form without departing from the principle of my invention which consists in the combination of devices by which this peculiar mode of cutting is effected.

Having thus set forth my invention what I claim as new and desire to secure by Letters Patent is—

1. The combination of the rotating disk cutter, with the pressers, and bed, substantially in the manner and for the purposes herein described.

2. I claim the combination of the Bramah wheel so called, with the rotating disk cutter and its accessories, for the purpose of planing, substantially as is herein set forth.

January 29th, 1853.

JAMES A. WOODBURY.

In presence of—
CYRUS BANCROFT,
DWIGHT F. HOVEY.